(12) United States Patent
MacPhee

(10) Patent No.: US 7,473,481 B2
(45) Date of Patent: Jan. 6, 2009

(54) PHOTO-CATALYTIC REACTOR

(75) Inventor: Donald Elliot MacPhee, Aberdeenshire (GB)

(73) Assignee: The University Court of the University of Aberdeen, Aberdeen (GB)

( * ) Notice: Subject to any disclaimer, the term of this patent is extended or adjusted under 35 U.S.C. 154(b) by 194 days.

(21) Appl. No.: 10/547,633

(22) PCT Filed: Feb. 27, 2004

(86) PCT No.: PCT/GB2004/000806

§ 371 (c)(1),
(2), (4) Date: May 5, 2006

(87) PCT Pub. No.: WO2004/079847

PCT Pub. Date: Sep. 16, 2004

(65) Prior Publication Data

US 2006/0246342 A1 Nov. 2, 2006

(30) Foreign Application Priority Data

Mar. 1, 2003 (GB) .................................. 0304709.9

(51) Int. Cl.
*H01M 8/10* (2006.01)
*H01M 4/88* (2006.01)
*H01M 4/90* (2006.01)

(52) U.S. Cl. ............................ 429/30; 429/40; 429/44; 429/111; 502/101

(58) Field of Classification Search .................. 429/30, 429/33, 40, 44, 111; 502/101
See application file for complete search history.

(56) References Cited

U.S. PATENT DOCUMENTS

| 4,544,470 | A | 10/1985 | Hetrick et al. ............... 204/248 |
| 6,342,128 | B1 | 1/2002 | Tabatabaie-Raissi et al. ..... 204/157.15 |
| 6,387,230 | B1 | 5/2002 | Murphy et al. ............... 204/296 |
| 6,409,928 | B1 | 6/2002 | Gonzalez et al. ............ 210/748 |
| 6,632,332 | B1 | 10/2003 | Takaki ......................... 204/155 |
| 2002/0083644 | A1 | 7/2002 | Sata et al. ....................... 48/61 |

FOREIGN PATENT DOCUMENTS

| DE | 3727630 | | 10/1988 |
| EP | 1151792 | | 11/2001 |
| JP | 04-342964 | * | 11/1992 |
| JP | 2001229937 | | 8/2001 |
| JP | 2002-83433 | * | 3/2002 |

* cited by examiner

*Primary Examiner*—Stephen J. Kalafut
(74) *Attorney, Agent, or Firm*—Heslin Rothenberg Farley & Mesiti P.C.

(57) ABSTRACT

A photocatalytic reactor, capable of generating an electric current by consumption of a fuel containing organic material, comprises a direct oxidation fuel cell including an anode and a cathode. The anode is a photocatalysis-assisted anode which comprises a photocatalyst on a surface of an electrically-conductive substrate so arranged as to be receptive to light. A light-transmissive proton-conductive membrane is arranged between the anode and the cathode, such that light passes through said membrane as a final stage in the optical path to the photocatalyst. The photocatalyst promotes oxidation of organic material and generates electron-hole pairs. The reactor, configured to support multiple cells in a stacked array, is provided with inlet(s) for introducing said fuel and connector(s) for connection to an external electrical circuit.

18 Claims, 10 Drawing Sheets

Thermo-gravimetric data for pre-dried WO₃-based catalyst.

FTIR spectra for catalyst samples pre-dried at 100 and 450°C.
*960 + 820 cm⁻¹ ν(W=O); 650 + 760 cm⁻¹ O-W-O UV/visible reflectance spectra for the 'WO₃-based' catalyst sample pre-dried at 450°C Activity of catalyst indicated by colour degradation of methylene blue solutions (5 ppm).

PHOTO-CATALYTIC REACTOR

CROSS REFERENCE TO RELATED APPLICATIONS

This application is a 371 filing of PCT International application no. PCT/GB2004/000806 filed Feb. 27, 2004 and published in English as WO 2004/079847 A2 on Sep. 16, 2004 which claims priority of GB application no. 0304709.9 filed Mar. 1, 2003, the disclosures of which are hereby incorporated herein by reference in their entirety.

FIELD OF THE INVENTION

The present invention generally relates to use of fuel cells, and in particular liquid feed organic fuel cells wherein oxidation of the fuel is achieved by photocatalysis. The invention to be particularly described hereinafter provides an energy efficient photocatalytic reactor.

BACKGROUND OF THE INVENTION

Fuel cells are electrochemical cells in which a free energy change resulting from a fuel oxidation reaction is converted into electrical energy. In an organic/air fuel cell an organic material such as methanol or other suitable fuel is oxidised to carbon dioxide at the anode whilst oxygen from air, or oxygen enriched air, or oxygen gas itself, is reduced to water at the cathode.

Two types of organic/air fuel cells are generally known:
1. An indirect fuel cell in which the organic fuel is catalytically reformed and processed into hydrogen, which is used as the actual fuel for the fuel cell by being oxidised at the anode.
2. A direct oxidation fuel cell in which the organic fuel is directly fed into the fuel cell and oxidised at the anode which typically employs platinum group metals or alloys containing platinum group metal as the catalyst.

Direct oxidation fuel cells are currently the subject of substantial interest for use in a wide variety of applications. Such cells have the potential for providing useful energy outputs in a "clean" and efficient manner using renewable fuels such as methanol. Such fuels can be obtained, for example, by biomass fermentation processes.

Difficulties encountered in producing a practical direct fuel cell include:
  Catalyst and electrode design and efficiency, avoiding poisoning and minimising the production of undesirable side products such as carbon monoxide;
  Efficiency of the cathode, especially if air is used as the oxygen containing gas, the nitrogen present can 'blanket' or slow down the transport of the oxygen to the catalyst surface;
  Fuel 'cross-over', i.e. the anode and cathode of the cell are separated by an ionically conductive medium such as a high molecular weight electrolyte or solid proton conducting membrane, but if the fuel can permeate that membrane and be transported from the anode to the cathode then efficiency is lost; and
  Choice of electrolyte—direct oxidation fuel cells often employ sulphuric acid as the electrolyte but the consequent presence of sulphate ions and sulphur can result in poor performance.

In U.S. Pat. No. 5,599,638 an improved type of cell using a solid polymer electrolyte and improved electrodes is described, with yet further improvements being revealed in U.S. Pat. No. 6,303,244 by the same inventors. A notable feature of that work is the use of a solid polymer electrolyte, a perfluorosulphonic acid containing polymer, such as "Nafion®". This avoids the use of sulphuric acid electrolyte and gives improved performance from the cell.

In U.S. Pat. No. 5,094,927 an alternative solid electrolyte is described, a proton conducting solid comprising at least one oxide of an element selected from Group IVB, VB, VEB, and VIII elements of the Periodic Table, silicon dioxide, and at least one fluoride of an element selected from the elements in Group IIA and IIIB of the Periodic Table. Such an electrolyte is proposed as a feature of an indirect (hydrogen/oxygen) fuel cell in that patent.

A disadvantage of the known types of fuel cell is that they generally require highly purified fuel to prevent catalyst poisoning. The fuel cell of U.S. Pat. No. 6,303,244 requires highly pure methanol, the inventors envisage having to fit filtration systems to remove hydrocarbon traces from the fuel when their invention is used in an automotive environment.

An object of the present invention is to provide improvements in or relating to fuel cells, whereby the aforesaid disadvantages of the prior art are obviated or mitigated.

A further object of the invention is to provide a direct oxidation type of liquid feed fuel cell that utilises photocatalysed oxidation at the anode.

Another object of the invention is to provide means of gathering and directing light to the photocatalytic anode.

A yet further object of the invention is to provide a photocatalytic reactor that can be utilised in the intended destruction of organic compounds present in waste streams from industrial processes in an energy efficient manner.

SUMMARY OF THE INVENTION

Accordingly, the aforesaid objects are addressed in that the present invention provides a photocatalytic reactor which includes features of a modified direct oxidation fuel cell wherein the oxidation of the fuel is carried out at an anode that comprises a photocatalyst on a conducting substrate. It will be recognised that by this application of the photocatalyst, one obtains an anode where the photocatalyst is used to induce the necessary charge separation to allow reaction with the fuel, i.e. the function of the photocatalyst is to produce electrons and holes. Those skilled in the art will recognise that the electrons are removed by the external circuit and the holes produce protons by interaction with the fuel. This approach to the oxidation step offers advantages in that a different catalyst technology is employed in comparison with a conventional direct oxidation fuel cell with the ability to use a wide range of fuels, even contaminated fuels, in prospect.

Thus according to the present invention there is provided a photocatalytic reactor capable of generating an electric current by consumption of a fuel containing organic material, said reactor comprising a direct oxidation fuel cell including an anode and a cathode, wherein the anode is a photocatalysis-assisted anode which comprises a photocatalyst on a surface of an electrically-conductive substrate so arranged as to be receptive to light, and a proton-conductive membrane arranged between said anode and the cathode, such that light passes through said membrane as a final stage in an optical path to the photocatalyst, the said photocatalyst being capable of promoting the oxidation of organic material and generating electron-hole pairs, and said reactor is provided with means for introducing said fuel, and means for connection to an external electrical circuit.

The cathode maybe selected from a mesh, a porous element or a perforated strip, and the material thereof is a noble metal, e.g. platinum or silver, or catalytic metals or alloys known in the art as suitable for this purpose, or more modern materials such as ceramics.

The reactor is preferably configured to support multiple fuel cells of the aforesaid type in a stacked array.

The arrangement of the photocatalyst to receive light may involve an optical path wherein the aforesaid proton-conductive membrane is juxtaposed with further light-conductive materials e.g. so-called "light pipes" to enhance the delivery of light to the photocatalytic surface. Such an arrangement facilitates the presentation of a plurality of photocatalytic cells in a battery or stack preferably of thin (0.3-0.5 mm) cells. Where light pipes are used, cell thickness may increase to approximately 1 mm or more. The light source is preferably natural light (solar energy), but artificial light sources may be also provided. The operation of the invention may be improved by provision of light gathering and intensification optics.

Examples of suitable materials that can serve as photocatalysts for the purposes of this invention include but are not limited to titanium oxides, titanium oxides doped with nitrogen, tungsten oxides, mixed oxide systems such as titanium oxides in combination with tungsten oxides or molybdenum oxides, or indium nickel tantalates. It is preferred that the photocatalyst comprises elements exhibiting stable mixed oxidation states.

It is observed for the purposes of better understanding of the invention that although in this application and in the literature, reference is made to these materials as "photocatalysts", the strict position is that these materials operate as light-assisted oxidising agents which only exhibit catalytic properties in the electrochemical cell. Given that oxidation of fuel results in reduction of the "photocatalyst" metal (tungsten, titanium, molybdenum, vanadium, etc), $M^z$ to $M^{z-1}$, it is believed that the cathode reaction re-oxidises the metal by withdrawing the extra electrons (generated by fuel oxidation) such that $M^{z-1} \rightarrow M^z + e$. Without this cathode effect, the concentration of the reduced form of the metal would increase to some saturation level (which depends on the relative stabilities of $M^z$ and $M^{z-1}$ (e.g. $Ti^{4+}/Ti^{3+}$, $W^{6+}/W^{5+}$), resulting in a change in oxide stoichiometry over time, i.e. not a true catalyst in the purest sense of the term. Consequently, one need not look amongst the limited class of true catalysts to identify material that would provide suitable photocatalytic effects for implementation of the invention described herein.

Although a photocatalytic fuel cell is already described in Japanese Patent 59165379, it is considered that this does not offer advantages of the fuel cell to be more particularly described hereinafter. That patent describes a fuel cell that uses organic substances, such as sodium formate solution, as fuel. The anode consists of a cadmium sulphide (CdS) single crystal that acts as a reactive oxidative surface when irradiated with ultra-violet light, shone into the cell via a quartz window. The cell is completed with a platinum black cathode immersed in a sulphuric acid electrolyte and an agar salt bridge to connect the anode and cathode chambers. Disadvantages of such an arrangement include the poor efficiency of the CdS photocatalytic surface, the limited scope of organic compounds that can be used and the need for quartz windowed chambers and ultra-violet light. Although more recent publications describe similar but more efficient photoelectrocatalytic cells, the requirement for ultra-violet light sources and quartz apparatus persists.

In contrast the present invention makes use of a range of photocatalysts such as titanium oxides that have been developed for use in the photocatalytic destruction of organic compounds. Such metal oxide materials can be modified to interact with visible rather than ultra-violet light, for example by nitrogen-doping or the introduction of other species such as other metal oxides into the catalyst composition.

Improved means of supplying the light to the photocatalytic surface are also provided by the present invention by use of light guides or conduits ("light pipes") as described hereinafter.

According to a further aspect of the invention there is provided a method of generating electrical power, particularly by consumption of an organic fuel, by a photocatalytic reaction conducted in a direct oxidation fuel cell, said method comprising the provision of a fuel cell and a source of fuel for the cell, wherein the anode of the cell is a photocatalysis-assisted anode which comprises a photocatalyst on a surface of an electrically-conductive substrate so arranged as to be receptive to light, and a light-transmissive, proton-conductive membrane arranged between said anode and the cathode, such that light passes through said membrane as a final stage in an optical path to the photocatalyst, the said photocatalyst being capable of promoting the oxidation of organic material and generating electron-hole pairs, exposing the photocatalytic surface to light, and supplying fuel to the anode for photocatalytic oxidation, and generating electrical power as a result of the said photocatalytic oxidation of the fuel.

It should be understood that the "fuel" that can be used for the purposes of the invention is not limited to methanol or indeed other alcohols but can include use of other organic substances in a fluid form to permit pumping and delivery thereof via conduits. The "cell" described herein has already demonstrated degradation of robust environmental pollutants, e.g. herbicides, pesticides, pathogens, endocrine disruptors and toxic bi-products arising from degradation of landfill constituents and contaminated land. Thus the invention is ideally suited for use in the water quality industry.

The fuel cell designed according to the principles of this invention consists of three principal components, namely an anode, a proton-conducting membrane, and a cathode, and the salient features thereof are as follows:

(i) Anode:
The anode comprises a photocatalyst coated onto a conducting substrate that is preferably perforated or porous to facilitate access of protons to the proton conducting membrane. Photocatalytic activity relies on photons, from an external light source, generating electron-hole pairs at the catalyst surface ($e^-$ and $h^+$). The substrate represents a fast electronic conductor. Its positioning has to be carefully considered with regard to the purpose of enabling electrons to be removed from the anode to an external circuit thus inhibiting recombination with holes and providing external electrical current. The holes generated interact with fuel (in this example methanol) leading to its oxidation with consequent production of $CO_2$ and protons:

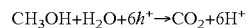

$$CH_3OH + H_2O + 6h^+ \rightarrow CO_2 + 6H^+$$

(ii) The Proton-Conducting Membrane (PCM):
The PCM separates the anode and the cathode and is made from a proton-conducting material, such as are already known in the art of conventional fuel cells, such as a perfluorosulphonic acid containing polymer (e.g. Nafion®). However it is preferable to make use of a proton conducting glass, such as a high conductivity glass with composition 5% $P_2O_5$: 95% $SiO_2$ as described by Nogami et al in Electrochemistry and Solid State Letters (2, 415-417, 1999). The advantages of using such a glass are in reduced potential for crossover of the fuel to the cathode and most especially the glass can permit the transfer of light to the anode. The PCM permits proton diffusion by a proton hopping mechanism and the water content of the porous glass enhances its conductivity (to typically $10^{-1.5}$ S·cm$^{-1}$). The transmission of light to the anode by using the PCM as a waveguide can be further improved by appropriate modifications to the structure of the membrane or supplementary "light pipes". For example selectively altering the refractive index characteristics or constructing the membrane or light pipes of pieces or fibres of glass with different refractive indices, by the use of light scattering particles distributed throughout the membrane, or by other means readily apparent to those skilled in the manufacture of optical devices, to achieve the optimum flux of light onto the anode surface. Suitable "light pipes" can be incorporated in the PCM (or on the surfaces of the anode not contiguous with the PCM) in order to deliver sufficient light to the photo-catalytic surface.

(iii) The Cathode:

The cathode provides the necessary surface for recombination, in the presence of oxygen from an external source (such as air, oxygen, oxygen-enriched air, or oxygen enriched fluid), of electrons from the external circuit and protons transported across the PCM. The net reaction at the cathode is given by:

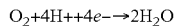

The preferred cathode is, but is not limited to, a fluid diffusion electrode employing a catalyst such as platinum or related catalytic metals (such as silver) or alloys such as are well known in the art or more modern materials such as ceramics.

The fuel cell of the present invention can be constructed in different shapes to suit the application intended. Application of sufficient light to the anode can be engineered by the provision of additional means, such as light pipes, or by shaping the component parts or the overall cell assembly appropriately to optimise the ability to direct light (natural or artificial) to the photocatalytic surface of the anode.

In order to produce higher output the fuel cell of the invention can be constructed as "stacks" i.e. connected in series as will be further described hereinafter.

The fuel cell of this invention can be utilised for any of the proposed uses of a conventional direct oxidation fuel cell, provided that a suitable light source is available. For instance the cells, fuelled by an oxidizable substance, preferably a relatively inexpensive organic liquid such as methanol, can be used to power electrically operated devices. The ability of the photocatalyst types selected for use in this invention to oxidise (thereby consuming, degrading, or destroying) a wide range of organic materials also allows the invention to be used as an energy efficient method of remediating waste streams, such as aqueous waste streams, from industrial processes that contain organic materials. The fuel cell can be fed such a waste stream which will be oxidised at the anode whilst generating electrical energy that can be used to power required equipment such as pumps, or used elsewhere in the event of a surplus being generated. Thereby, two objectives are achievable in that noxious materials are disposed of in an environmentally acceptable manner and, in so doing, useful energy is generated.

Photocatalytic oxidation of hazardous organic pollutants has been a growing area of environmental technology over the last twenty years. The mineralisation of low molecular weight alcohols and chlorinated alkanes, acetone and the partial oxidation of mycrocystins to less toxic forms in potable waters has been demonstrated, all using TiO$_2$-based catalyst. Conventional photocatalytic oxidation processes in this theme generally utilise photocatalyst slurries. This invention seeks to enhance catalyst efficiency by utilising thin films, as in the area of photoelectrocatalysis and photovoltaics, connected to an external electrical circuit. The prospect of recovering electrical energy from the degradative oxidation of organic pollutants is particularly attractive in terms of sustainability and waste utilisation.

There are, for example, applications of the invention in the oil and gas producing industry. The technology would be applicable to flow-through processes similar to those currently employed for hydrocyclone separators and other fluid treatment operations. Upstream organics include aliphatic and aromatic hydrocarbons, "demulsifiers" (urea-formaldehyde, phenolic resins, amines and sulphonates), fatty acids, aldehydes and ketones. The reactor of the present invention is particularly suited to the destruction of these polluting chemicals which are present as small droplets at low residual concentrations when conventional separating treatments have been applied to the contaminated aqueous stream.

The invention will now be further described by way of illustration with reference to the accompanying drawings.

DESCRIPTION OF THE DRAWINGS

In the accompanying drawings.

MODES FOR CARRYING OUT THE INVENTION

The fuel cell of the present invention will now be described by way of example in terms of a cell that uses methanol as the fuel, and performs as a photocatalytic reactor wherein the fuel is oxidised at the anode, releasing protons, but it will be understood that other fuels may be adopted, and that organic contaminants in fluids e.g. oil-polluted water can serve as "fuel".

Figure 1:
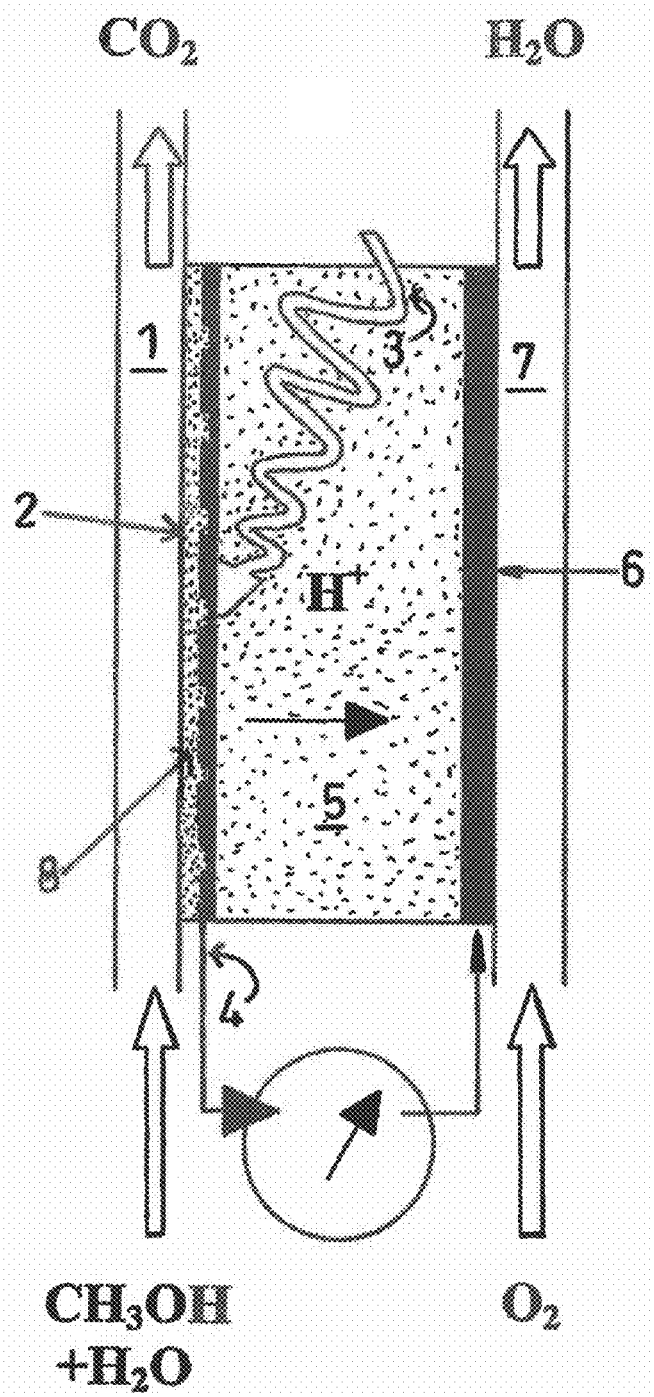
FIG. 1 shows a schematic drawing of the photocatalytic reactor fuel cell of the invention, in an embodiment utilising methanol as fuel.

As depicted in FIG. 1, a fuel cell comprising an anode 4 and cathode 6. The anode 4 is a photocatalysis-assisted anode comprising a photocatalyst 8 on a surface of an electrically-conductive substrate 2. A light-transmissive proton-conductive membrane 5 is arranged between the anode 4 and the cathode 6. Light passes through the membrane 5 as a final stage in the optical path to the photocatalyst 8. The photocatalyst 8 oxidizes organic material from a fuel supply 1 using an oxidant supply 7. The light transmittance of the proton-conductive membrane 5 may be supplemented by the incorporation of light pipes 3.

Figure 2:
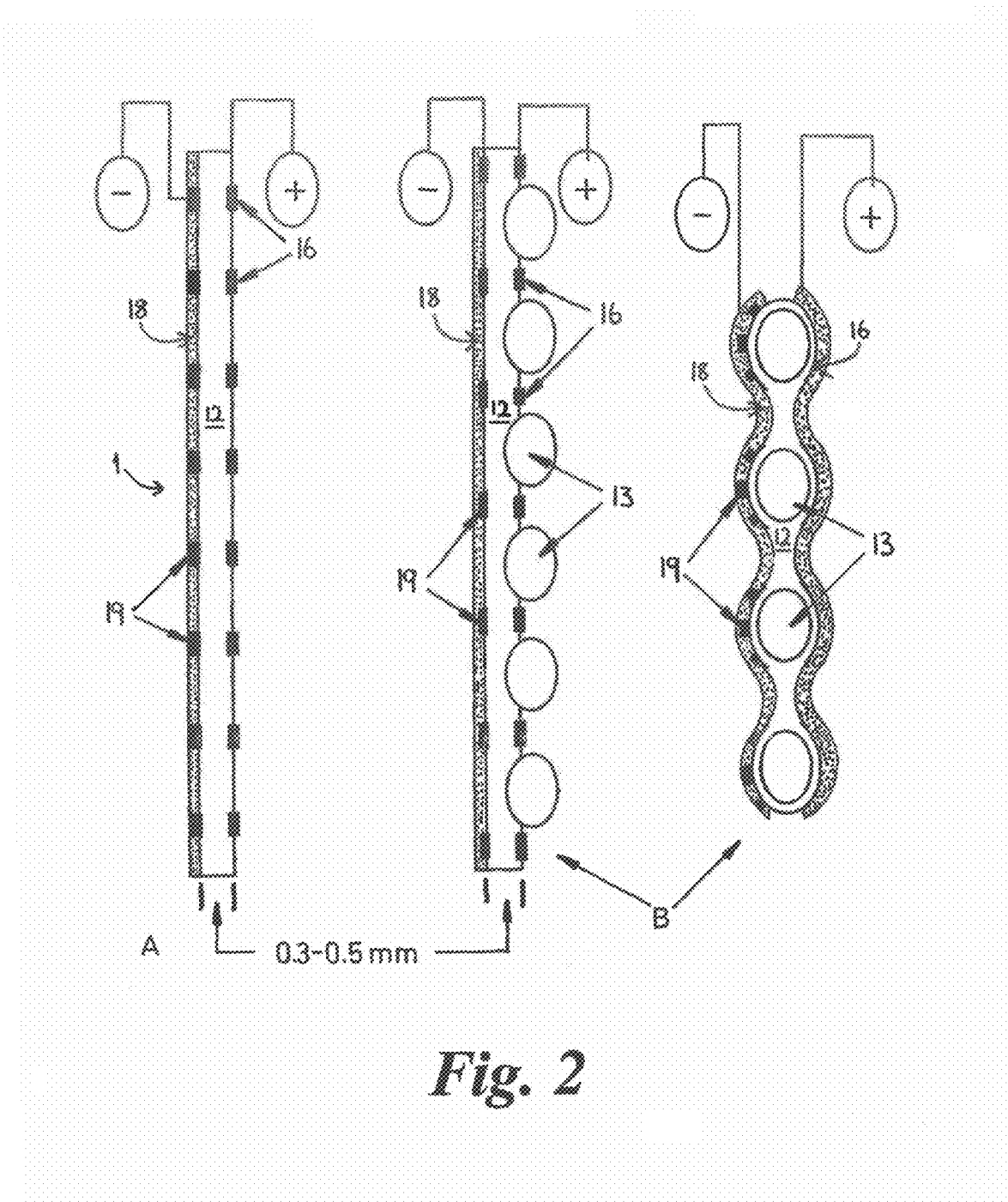
FIGS. 2A & B show the construction of three embodiments of the fuel cell, FIG. 2B showing the use of "light pipes" in two different arrangements to conduct light to the photocatalytic anode.

The fuel cell comprises electrodes and proton-conducting membrane units as illustrated in FIG. 2. Perforated, porous or grid electrodes ensure that charge carriers can transit across all interfaces and that all electrical contacts within the electrochemical cell are continuous so that one external connection to a mesh or foraminated metallic sheet will be sufficient (see FIG. 2), but multiple connections are not excluded. The photocatalyst (18) can be dip-coated or applied by other means onto the previously fabricated proton conducting membrane (PCM) (12) having a platinum, or other electronically conducting mesh (19) partially embedded into its surface. The cathode (16) is a mesh or porous element or perforated strips made from platinum or silver. A proton conducting metal film may separate the PCM from the cathode. Anode (1) and cathode (16) are connected externally via an electrical load.

The light transmittance of the PCM may be supplemented by the incorporation of light pipes (13) (see FIG. 2, Options B). These can be of similar composition to the PCM and are capable of scattering light directed via the pipes through the perforated conductor and onto the catalyst surface. They can also serve to add mechanical robustness to the assembly which could be typically up to 1 mm thick or more (measured in the direction of proton transport) but can be of other suitable dimensions depending on the application to which the cell is put. Two of the possible arrangements for the light pipes are shown in FIG. 2 option B. The second arrangement shown, with the light pipes incorporated into the body of the PCM, has advantages. The mechanical robustness of the structure of the cell is improved and both electrodes can have a maximum surface area in contact with the PCM to improve efficiency. Furthermore the ridged or corrugated shape of the cell further enhances the surface area of the cell and hence the potential power output.

Figure 3:
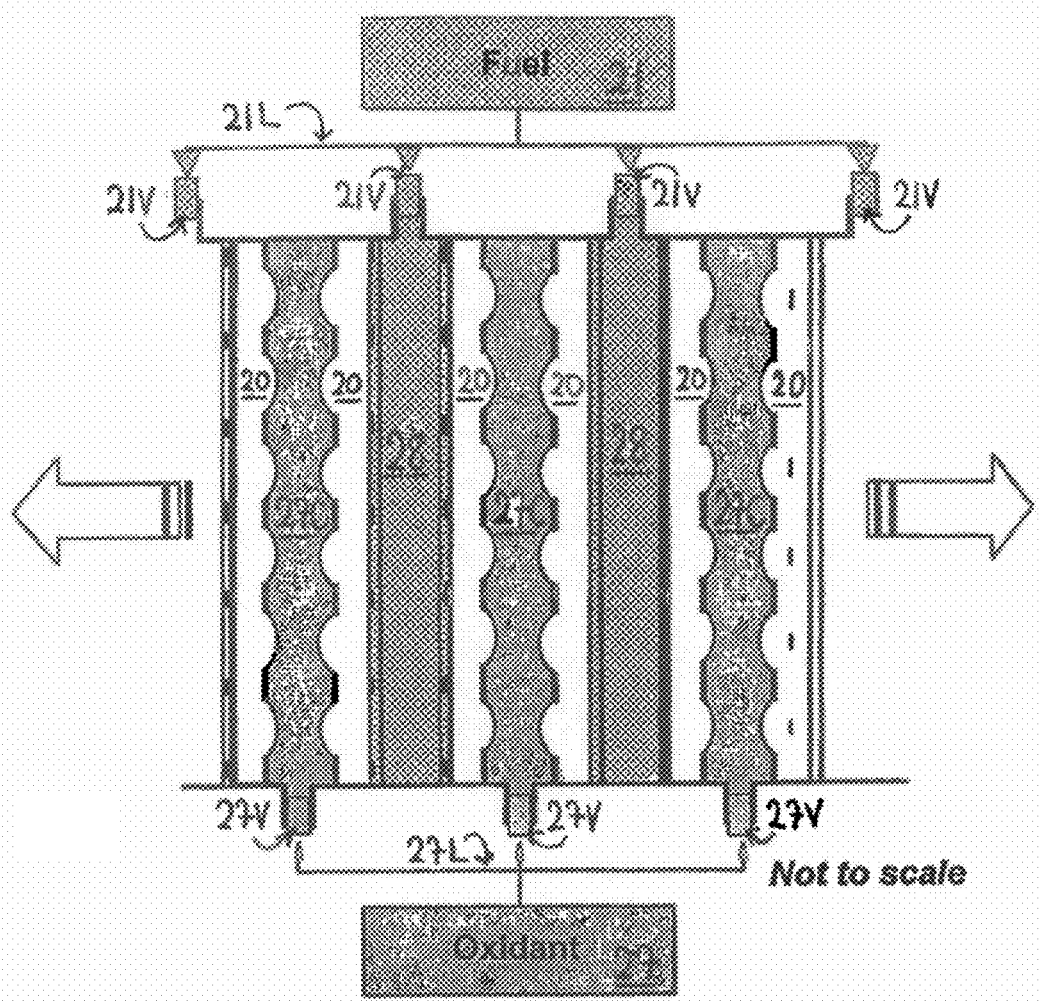
FIG. 3 shows a stack or battery of the fuel cells of the invention.

Each fuel cell unit as shown in FIG. 2 can be used alone as a single cell to produce power, but greater effectiveness can be gained by making a device containing several or many units configured, for example in a "stack" or battery as shown in FIG. 3.

Cell assemblies (20) are mounted back to back such that fuel can be admitted via feed lines (21L) and pressure control valves (21V) into photocatalyst chambers (28). Light is directed into the cells (20) perpendicular to the plane of the diagram by suitable means. Oxidant, as air or oxygen-enriched air (or some other suitable oxidant) is fed via oxidant lines (27L) and pressure control valves (27V) into oxidant chambers (27C). Electrical current is collected from the conducting meshes or perforated/porous metallic sheets. Fuel and oxidant supplies (21 and 27) can be conditioned to optimize cell performance by the use of compressors and heat exchangers (not shown) as appropriate. Note that many cells can be mounted into modules capable of connecting and disconnecting into a flow system. This enables modules to be removed and replaced, or by-passed to enable servicing, catalyst regeneration or other maintenance. In a preferred embodiment of the present invention wherein light activation of the catalyst is achieved by illumination from within the PCM great flexibility regarding stack design is possible. Multiple cells can be mounted in modules such that fuel and oxidant flows can be directed simultaneously onto their respective surfaces.

In a preferred embodiment of the invention, considered to offer the best mode of performance at the present time, the catalyst is a $WO_3$-based material the characteristics of which are consistent with a polytungstic acid, which although available commercially as a photochromic material, is further characterised below.

Preparation of a '$WO_3$-based' Catalyst Suitable for Use in Performance of the Invention Preparation Ammonium tungstate (0.5 g) (99.999%) (Alfa Cesar) was added to distilled water (200 mL) with constant stirring at room temperature. The pH was adjusted to 1 using nitric acid (67% AnalaR®). Precipitation occurred within 2 hrs. After this time the stirring was stopped and the white/yellow precipitate was allowed to settle for 24 hrs. Most of the liquid was then decanted and the precipitate was dried at 100 degrees for 2 hrs. The resulting yellow powder was then mixed with 10 ml of deionised water and deposited on a gold-coated glass slide area (3 cm×2.5 cm); a typical amount of catalyst deposited on a slide was 0.01 g. The slide was then heat treated to between 100 and 450 degrees C. (normally for 10 minutes) yielding a white-yellow catalyst.

Characterization

Figure 4:
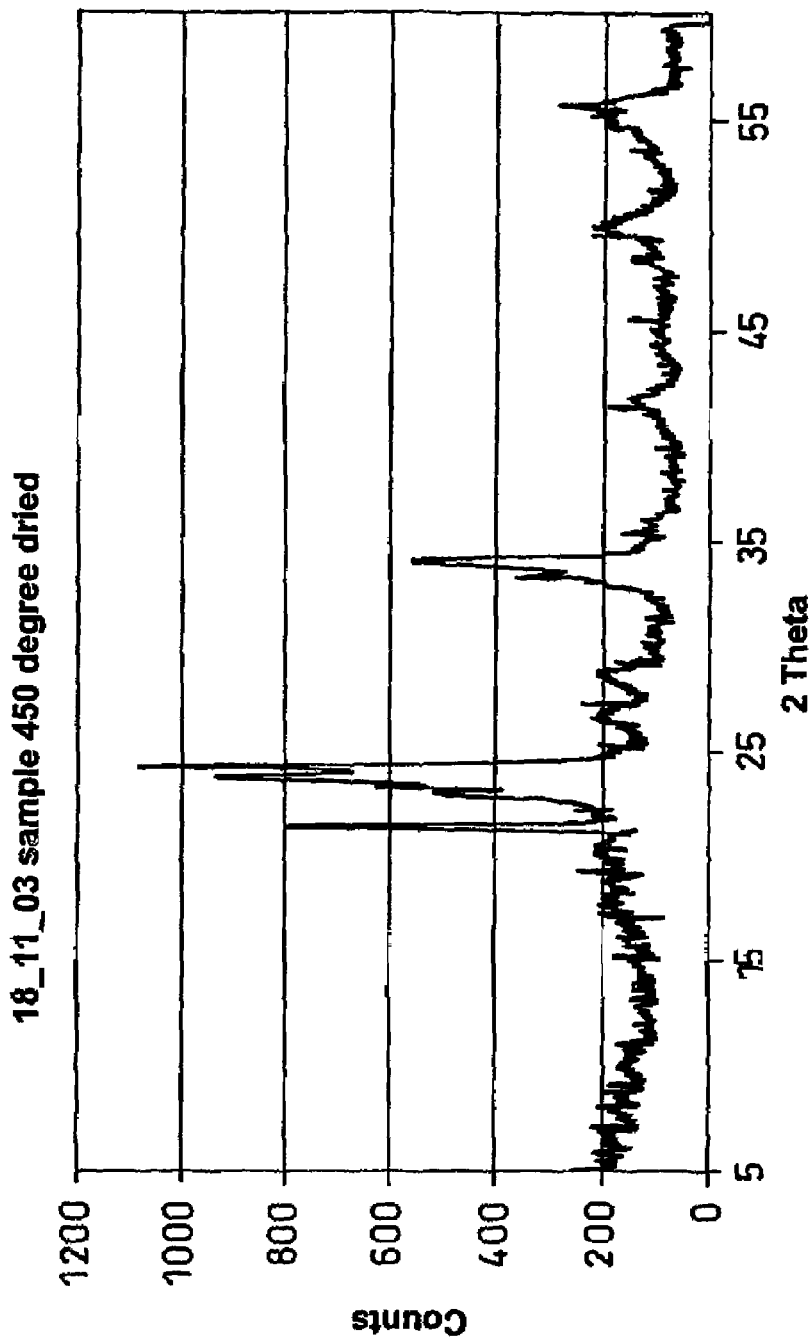
FIG. 4 shows X ray diffraction data for a polytungstic acid material prepared for use as a photocatalyst in the fuel cell of the invention.

X-Ray Diffraction:

FIG. 4 shows the pattern obtained from the precipitated product. The peak positions shown are consistent with $WO_3$ but the broad band from approximately 13° to 32° 2θ suggests that a less well crystallised (or nano-crystallised) constituent is also present.

Figure 5:
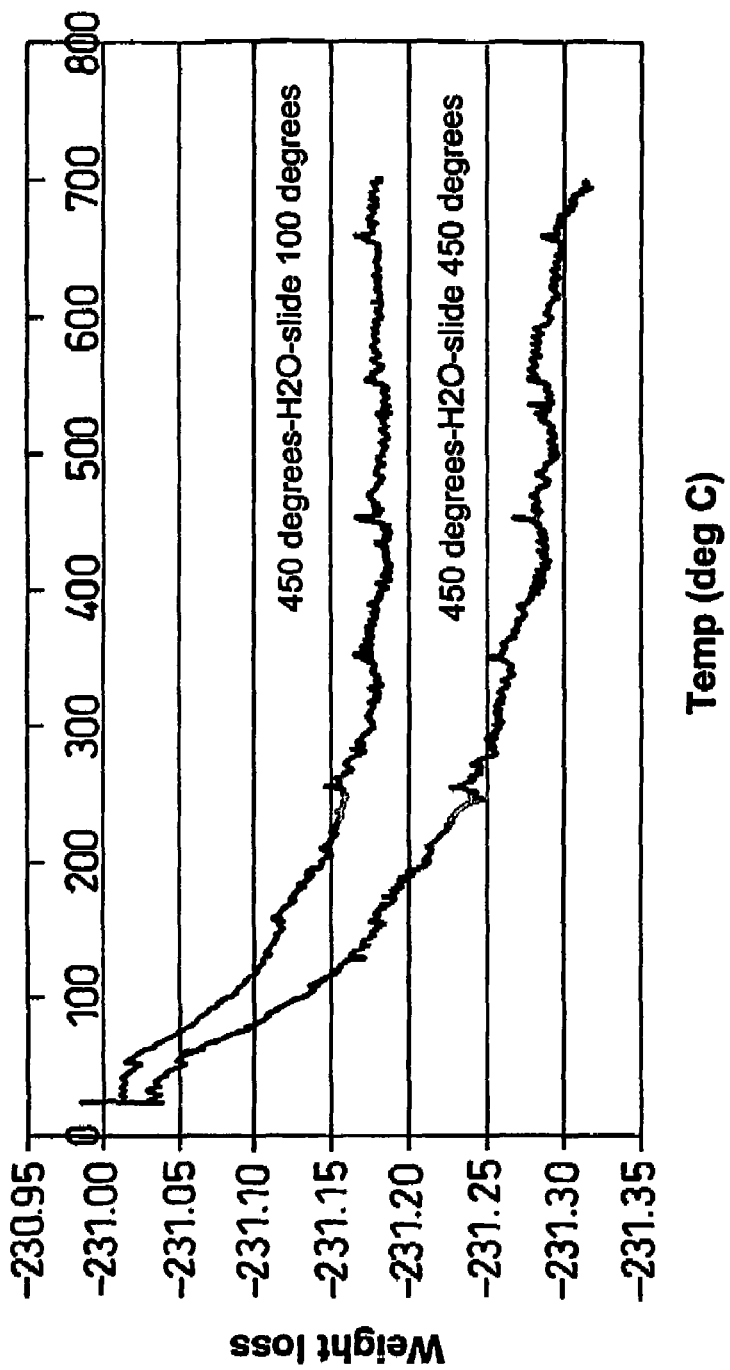
FIG. 5 shows thermo-gravimetric analyses of a polytungstic acid material prepared for use as a photocatalyst in the fuel cell of the invention.

Thermogravimetric Data:

FIG. 5 shows the results of thermogravimetric analyses of the catalyst material dried at 450° C., subsequently re-dispersed in water and then re-dried at 100 or 450° C. prior to final equilibration in water.

Although TG-MS data are not shown here, the weight loss in both cases is attributable to water. Since $WO_3$ does not contain water, it is evident that the solid catalyst is not pure $WO_3$ but is partially hydrated, the temperature of dehydration suggesting that the water is strongly bound, probably to surfaces, as hydroxide. X-ray data indicate that the level of well-crystallised hydroxide material is low (below detection limits) but it is suggested that a poorly crystallised surface hydroxide layer may be important in defining the photocatalytic performance of this material.

| Final drying temp (° C.) | Initial weight (mg) | Wt. Loss (%) |
|---|---|---|
| 100 | 36.37 | 0.33 |
| 450 | 38.86 | 0.73 |

It is noted that the water loss associated with the sample heated to 450° C. is greater, and this may be related to surface area effects. Transmission electron microscopy reveals a rather broad particle size distribution in these specimens limiting the level of certainty that can be attributed to the interpretation. However, better control of particle size in products is achievable through modification to the sol-gel preparative route (see below).

Fourier Transform Infra Red (FTIR)

Figure 6:
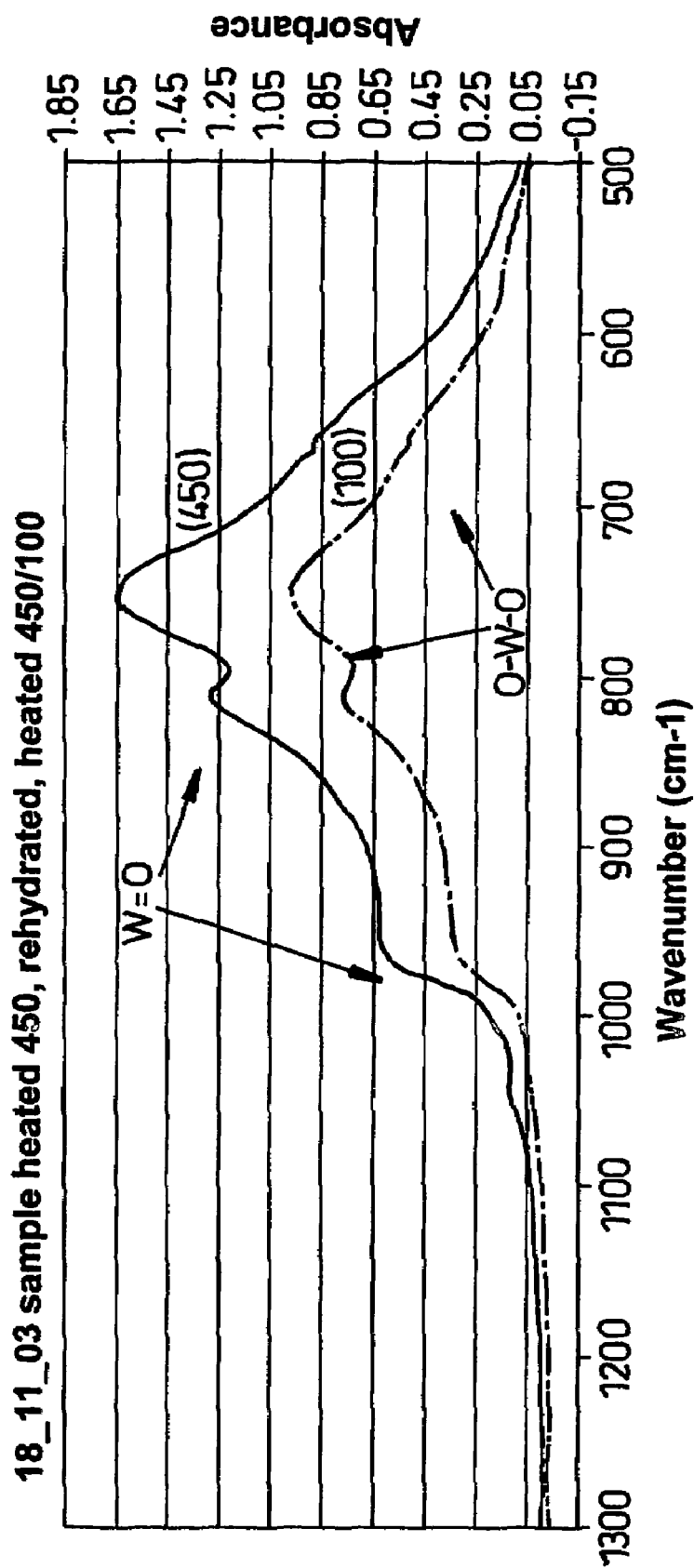
FIG. 6 shows Fourier Transform Infra Red spectra for a polytungstic acid material prepared for use as a photocatalyst in the fuel cell of the invention.

Catalysts samples were dispersed in a mulling agent (KBr) and pressed into discs. FTIR spectra were then obtained and are shown in FIG. 6 (upper spectrum—sample re-dried at 450° C.; lower spectrum—sample re-dried at 100° C.).

Reflectance UV/Visible Spectroscopy

Figure 7:
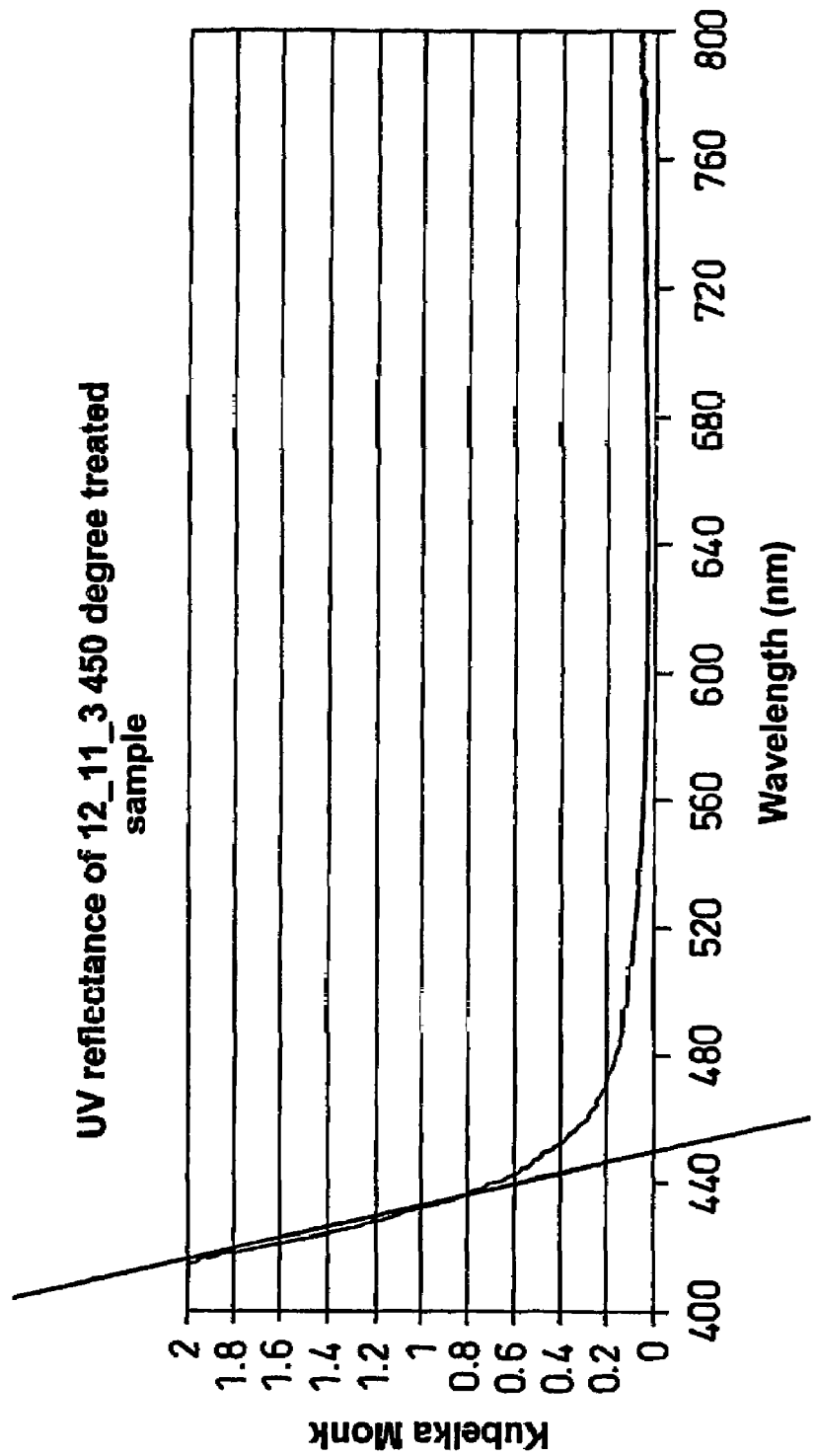
FIG. 7 shows a reflectance UV/visible light spectrum of a polytungstic acid material prepared for use as a photocatalyst in the fuel cell of the invention.

FIG. 7 shows a reflectance UV/visible light spectrum of the 'WO$_3$-based' catalyst, and indicates that the band 'gap' corresponds to approximately 450 nm. This confirms that the catalyst absorbs radiation in the violet region of the visible spectrum and is consistent with the observed yellow colour of the catalyst.

Catalyst Performance in the Photocatalytic Fuel Cell

Figure 8:
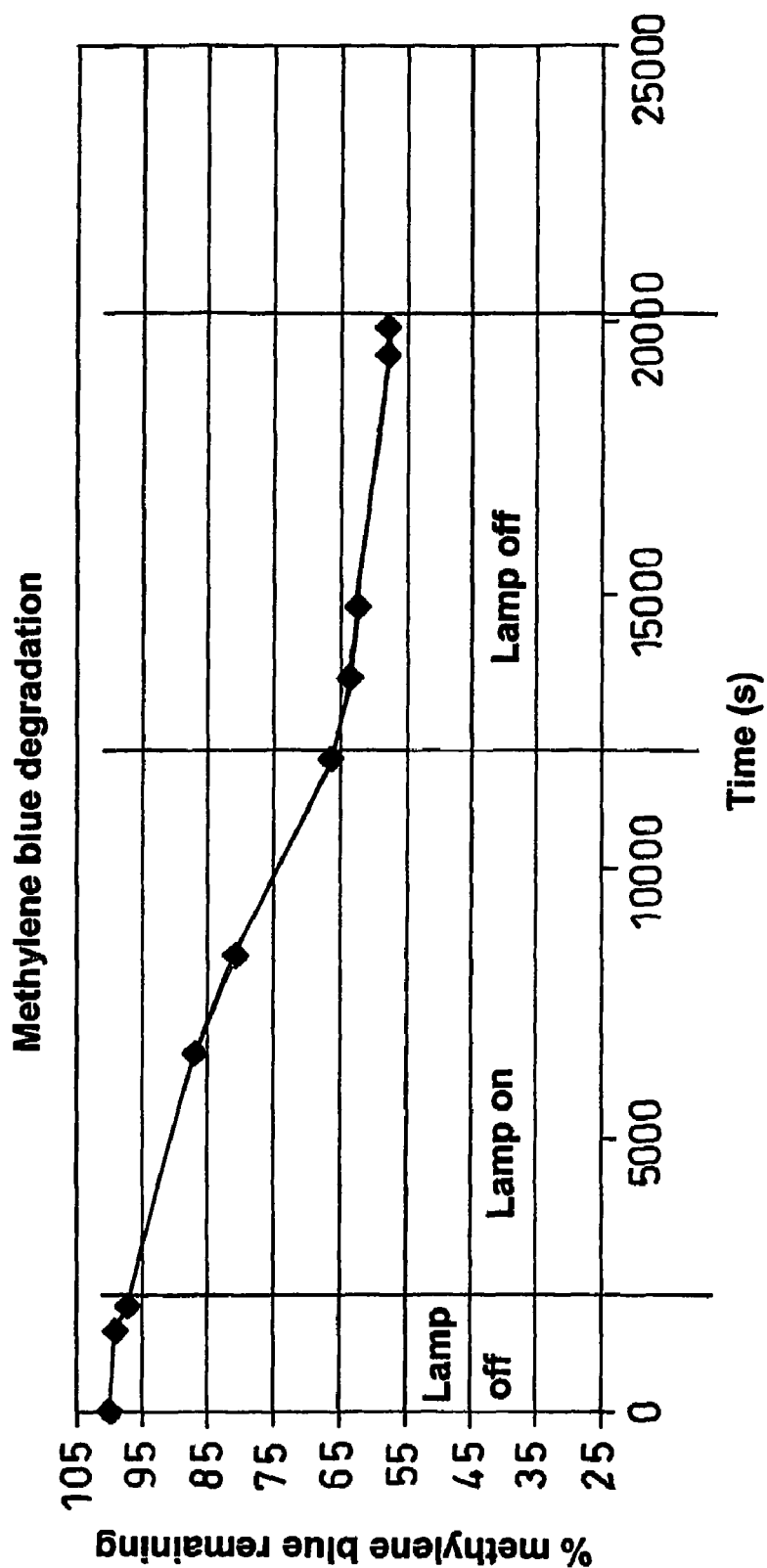
FIG. 8 shows photocatalytic activity of a polytungstic acid material prepared for use as a photocatalyst in the fuel cell of the invention.
Figure 9:
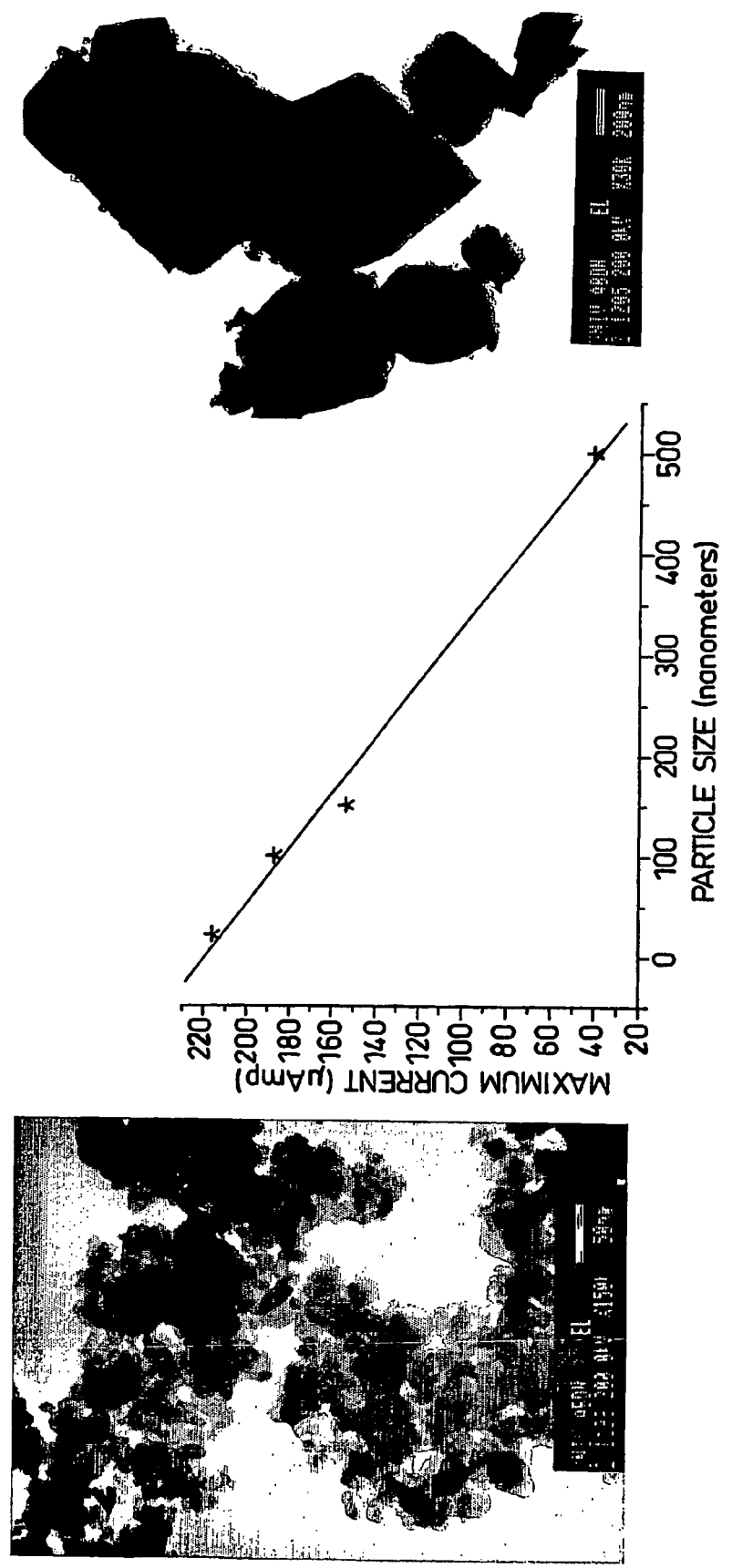
FIG. 9 shows transmission electron microscopy (TEM) images and correlation between recovered photocurrent and catalyst particle size.

The function of the material as a photocatalyst is measured by its ability to degrade the colour of methylene blue solutions introduced to the photocatalytic fuel cell. FIG. 8 shows the degradation activity of the catalyst (pre-dried 450° C.) as a function of time, with or without illumination by visible light. Note that the gradient of the graph is dependent on whether or not the light source is on; steeper slopes are observed when the catalyst is illuminated. The active catalyst area was approximately 6 cm$^2$, and the methylene blue solution volume was approximately 70 mils. The recovered photocurrent was 18 μA (maximum slope).

The rate of colour degradation in methylene blue was initially correlated with the recovered photocurrent from the cell but it was subsequently shown, through adaptation (Santato, C., et al, *J. Am. Chem. Soc.*, 123, 2001, 10639-49) of the sol-gel technique described above, that there was a strong inverse correlation between current and catalyst particle size.

Electrical Conductivity

Figure 10:
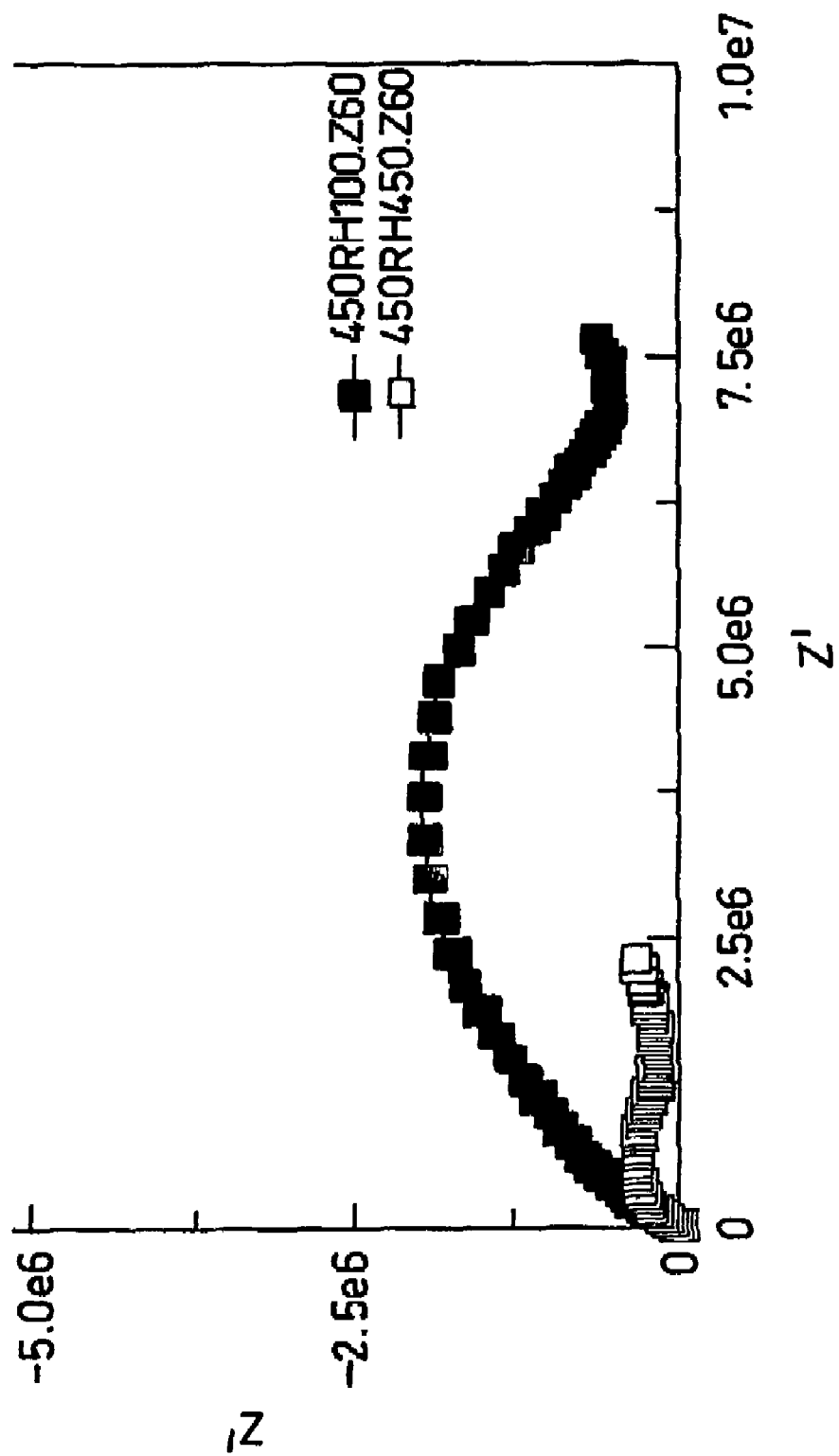
FIG. 10 shows AC impedance derived data on 'WO$_3$-based' photocatalyst materials.

Electrons generated on catalyst surfaces may be lost by interaction with adsorbed oxygen if they cannot readily be transferred through the catalyst to the electronically conducting substrate. A further factor in defining cell current recovery therefore is the conductivity of the catalyst. AC impedance spectroscopy measurements were used to determine conductivity characteristics of the catalyst and preliminary data are reported below and in FIG. 10.

| Sample | 450rh100 | 450rh450 |
|---|---|---|
| Thickness (mm) | 1.08 | 0.83 |
| R (MΩ) | 7.15 | 1.54 |
| σ (S · cm$^{-1}$) | $1.54 \times 10^{-8}$ | $1.9 \times 10^{-8}$ |

It is envisaged that at the higher firing temperature, better particle-particle contact is achieved through partial sintering. This provides better means for the transfer of electrons between grains and is consistent with the higher conductivity of the 450° C. sample.

Summary and Initial Interpretation

It is considered that the reduced tungsten (W(V)) is largely associated with surface hydroxylated tungsten 'blue' compositions of the general form H$_x$WO$_{3-x/2}$. The smaller the particle size, the higher the surface area and a higher anticipated fraction of hydrated material. Potentially, this higher fraction could correlate with the number of charge carriers produced. The important (essential) function of the cathode is then to draw these carriers out of the catalyst and this therefore relies on low electronic resistance of the catalyst.

INDUSTRIAL APPLICABILITY

The fuel cell described herein provides a photocatalytic reactor which can be employed throughout the range of applications envisaged for conventional direct oxidation fuel cells, and can also be applied to oxidation of hazardous organic pollutants in the anode reaction in the fuel cell of the invention. Thus the invention is applicable in the field of water quality, environmental remediation technology, as a reactor for vital fluids remediation and particularly to the disposal of hazardous organic pollutants. Such a remediation reactor may be applied in the oil and gas producing industry, e.g. in operational use with hydrocyclone separators and other fluid treatment operations, installed as an in-process facility to handle organic contaminants.

The invention claimed is:

1. A photocatalytic reactor for generating an electric current by consumption of a fuel containing organic material, said reactor comprising a direct oxidation fuel cell including an anode and a cathode, wherein the anode is a photocatalysis-assisted anode which comprises a photocatalyst on a surface of an electrically-conductive substrate so arranged as to be receptive to light, and a light-transmissive, proton-conducting membrane arranged between said anode and the cathode, such that light passes through said membrane as a final stage in an optical path to the photocatalyst, the photocatalyst promoting oxidation of the organic material and generating electron-hole pairs, and said reactor is provided with means for introducing said fuel, and means for connection to an external electrical circuit.

2. A photocatalytic reactor according to claim 1, wherein the membrane comprises a proton-conducting glass.

3. A photocatalytic reactor according to claim 1, wherein a proton-conducting metal film separates the proton-conducting membrane from the cathode.

4. A photocatalytic reactor according to claim 1, wherein the membrane is a solid electrolyte for conducting light onto the photocatalyst on the surface of the anode.

5. A photocatalytic reactor according to claim 4, wherein the light-conducting solid electrolyte is chemically modified to enhance transmission of light onto the photocatalyst.

6. A photocatalytic reactor according to claim 4, wherein the light-conducting solid electrolyte is physically modified to enhance transmission of light onto the photocatalyst.

7. A photocatalytic reactor according to claim 1, wherein the anode comprises material exhibiting photocatalytic effects, said material comprising stable mixed valency metal oxide systems.

8. A photocatalytic reactor according to claim 1, wherein the anode comprises a material exhibiting photocatalytic effects selected from indium nickel tantalates, tungsten oxides, titanium oxides and combinations thereof with at least one of tungsten oxides, molybdenum oxides and nitrogen.

9. A photocatalytic reactor according to claim 1, wherein the photocatalyst is activated by visible light (400-750 nm).

10. A photocatalytic reactor according to claim 1, wherein the fuel is an aqueous liquid that contains organic pollutants which are capable of being degraded by photocatalytic oxidation reaction at the anode.

11. A photocatalytic reactor according to claim 1, wherein the cathode is selected from a mesh, a porous element or a perforated strip.

12. A photocatalytic reactor according to claim 1, wherein the cathode is made of a material selected from noble metals, catalytic alloys or ceramics.

13. A photocatalytic reactor according to claim 1, operationally connected in a flow-through configuration to a fluid flow line containing a contaminated fluid containing organic contaminants utilizable as fuel for the direct oxidation fuel cell.

14. An electrical power source comprising a plurality of modified direct oxidation fuel cells, each of said cells having a photocatalysis-assisted anode which comprises a photocatalyst on a surface of an electrically-conductive substrate so arranged as to be receptive to light, and a light-transmissive, proton-conductive membrane arranged between said anode and a cathode, such that light passes through said membrane as a final stage in an optical path to the photocatalyst, the photocatalyst promoting oxidation of organic material and generating electron-hole pairs, said cells being arranged to form a stack or battery.

15. A method of generating electrical power, particularly by consumption of an organic fuel, by a photocatalytic reaction conducted in a direct oxidation fuel cell, said method comprising provision of a fuel cell and a source of fuel for the cell, providing a photocatalytic surface at an anode of the cell, wherein the anode is a photocatalysis-assisted anode which comprises a photocatalyst on a surface of an electrically-conductive substrate so arranged as to be receptive to light, and a light-transmissive, proton-conductive membrane arranged between said anode and a cathode of the cell, such that light passes through said membrane as a final stage in an optical path to the photocatalyst, the photocatalyst promoting oxidation of organic material and generating electron-hole pairs, exposing the photocatalyst to light, and supplying fuel to the anode for photocatalytic oxidation, and generating electrical power as a result of said photocatalytic oxidation of the fuel.

16. A method according to claim 15, wherein the fuel cell is contained in a photocatalytic reactor and the reactor is provided with means for introducing said fuel and means for connection to an external electrical circuit.

17. A method of disposing of an organic material-polluted fluid comprising the application of said fluid in a fuel supply to a fuel cell contained in a photocatalytic reactor as claimed in claim 1.

18. A method for preparing a photocatalyst for use in a photocatalytic reactor as claimed in claim 1, the method comprising purification of an active catalytic component, recovering said purified component by deposition on a catalyst support, the catalyst support comprising a noble metal; and a heat treatment step applied to the purified and recovered component in the range of from 100 to 450° C. or above.

* * * * *